(12) United States Patent
Puon et al.

(10) Patent No.: US 7,861,002 B2
(45) Date of Patent: Dec. 28, 2010

(54) NETWORK ROUTER THAT EFFICIENTLY SWITCHES BETWEEN A PRIMARY DATA PATH AND A BACKUP DATA PATH

(75) Inventors: Roberto Puon, Madison, AL (US); David Perkinson, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 1222 days.

(21) Appl. No.: 10/764,693

(22) Filed: Jan. 26, 2004

(65) Prior Publication Data

US 2005/0021844 A1     Jan. 27, 2005

Related U.S. Application Data

(60) Provisional application No. 60/472,685, filed on May 22, 2003.

(51) Int. Cl.
   *G06F 15/173* (2006.01)
   *G06F 11/00* (2006.01)

(52) U.S. Cl. .................. 709/239; 709/238; 370/225; 370/227; 714/4

(58) Field of Classification Search .............. 709/238, 709/239, 230; 370/225, 227; 714/4, 30
See application file for complete search history.

(56) References Cited

U.S. PATENT DOCUMENTS

| | | | |
|---|---|---|---|
| 5,949,753 A | 9/1999 | Alexander, Jr. et al. | |
| 6,009,081 A * | 12/1999 | Wheeler et al. | 370/255 |
| 6,064,653 A * | 5/2000 | Farris | 370/237 |
| 6,108,300 A | 8/2000 | Coile et al. | |
| 6,115,378 A | 9/2000 | Hendel et al. | |
| 6,176,733 B1 | 1/2001 | Coile et al. | |
| 6,226,684 B1 | 5/2001 | Sung et al. | |
| 6,249,523 B1 | 6/2001 | Hrastar et al. | |
| 6,304,912 B1 | 10/2001 | Oguchi et al. | |
| 6,311,288 B1 * | 10/2001 | Heeren et al. | 714/4 |
| 6,490,252 B1 * | 12/2002 | Riggan et al. | 370/237 |
| 6,530,032 B1 * | 3/2003 | Shew et al. | 714/4 |
| 6,608,893 B1 | 8/2003 | Fleming et al. | |
| 6,868,509 B2 * | 3/2005 | Gale et al. | 714/43 |
| 6,987,727 B2 * | 1/2006 | Fredette et al. | 370/225 |
| 7,082,099 B2 * | 7/2006 | Ueno et al. | 370/216 |
| 7,116,679 B1 * | 10/2006 | Ghahremani | 370/463 |
| 7,167,443 B1 * | 1/2007 | Dantu et al. | 370/218 |
| 7,234,001 B2 * | 6/2007 | Simpson et al. | 709/239 |
| 7,349,327 B2 * | 3/2008 | Puon et al. | 370/216 |
| 7,455,591 B2 * | 11/2008 | Nguyen | 463/42 |
| 7,647,422 B2 * | 1/2010 | Singh et al. | 709/238 |
| 2003/0088698 A1 * | 5/2003 | Singh et al. | 709/239 |
| 2003/0145108 A1 * | 7/2003 | Joseph et al. | 709/239 |
| 2004/0054804 A1 * | 3/2004 | Li | 709/239 |
| 2004/0202105 A1 * | 10/2004 | Jones et al. | 370/228 |

* cited by examiner

*Primary Examiner*—Ario Etienne
*Assistant Examiner*—Gregory G Todd
(74) *Attorney, Agent, or Firm*—Lanier Ford Shaver & Payne, P.C.; Jon E. Holland (57) ABSTRACT

A network router initially communicates over a primary data path. Upon detection of an error condition associated with the primary data path, the network router initiates a layer 2 switch such that the communication occurring over the primary data path is switched to a backup data path. The layer 2 switch is preferably transparent to a layer 3 portion of the network router.

25 Claims, 7 Drawing Sheets

NETWORK ROUTER THAT EFFICIENTLY SWITCHES BETWEEN A PRIMARY DATA PATH AND A BACKUP DATA PATH

CROSS REFERENCE TO RELATED APPLICATION

This application claims priority to U.S. Provisional Application No. 60/472,685, entitled "System and Method for Backing Up a Data Path for a Network Router," and filed on May 22, 2003, which is incorporated herein by reference.

RELATED ART

In current communication networks, routers employ communication backup techniques that enable such routers to communicate over an alternative data path in the event that a primary data path is interrupted or fails. As an example, it is common for a router to communicate over a primary data path using a high speed communication link, such as a T1 link, for example. If a network failure occurs such that the communication over the primary data path fails or is significantly degraded, then the router is configured to establish a secondary data path using an alternative communication link and to switch communication from the primary data path to the secondary data path. Thus, communication with the router may be resumed in the event that a communication error or failure prevents or degrades communication over the primary data path.

Note that the alternative communication link typically communicates at a slower speed and/or higher cost than the communication link of the primary data path. Therefore, it is often more desirable to communicate over the primary data path in lieu of the secondary data path in the absence of a significant communication problem along the primary data path.

Unfortunately, it takes a finite amount of time for a router to detect the occurrence of a communication error or failure along the primary data path and to then switch to communicating over the secondary data path. During this finite time period, the router typically attempts to transmit over the primary data path resulting in the loss of data, and such a loss of data can be significant depending on the length of the finite time period. Thus, techniques for reducing the amount of time for detecting communication problems along the primary data path and/or switching to the secondary data path are generally desirable.

SUMMARY

Embodiments of the present invention pertain to network routers that efficiently switch between a primary data path and a backup data path.

A network router in accordance with one exemplary embodiment of the present invention comprises a layer 1 portion, a layer 2 portion, a layer 3 portion, and switching logic. The layer 1 portion has a first communication interface and a second communication interface. The first communication interface is configured to communicate with a first network over a first data path, and the second communication interface is configured to communicate with a second network over a second data path. The layer 3 portion has a routing table and is configured to provide a plurality of data packets destined for a particular destination. The layer 2 portion is configured to interface at least one of the data packets with the first communication interface. The switching logic is configured to automatically initiate a layer 2 switch such that the layer 2 portion begins to interface the data packets with the second communication interface in lieu of the first communication interface, wherein the layer 2 switch is transparent to the layer 3 portion.

A network router in accordance with another exemplary embodiment of the present invention comprises a first protocol stack, a second protocol stack, a third protocol stack, a plurality of network interfaces, and switching logic. The first protocol stack is configured to provide a plurality of data packets to be transmitted by the router to a particular destination. The plurality of network interfaces is configured to receive data packets from the first protocol stack, wherein the first protocol stack is configured to provide each of the plurality of data packets to one of the network interfaces. The switching logic is configured to receive each of the plurality of data packets from the one network interface. The switching logic is further configured to provide at least one of the plurality of data packets to the second protocol stack and to provide, in response to a detection of an error condition, at least one other of the plurality of said data packets to the third protocol stack.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION

Figure 1:
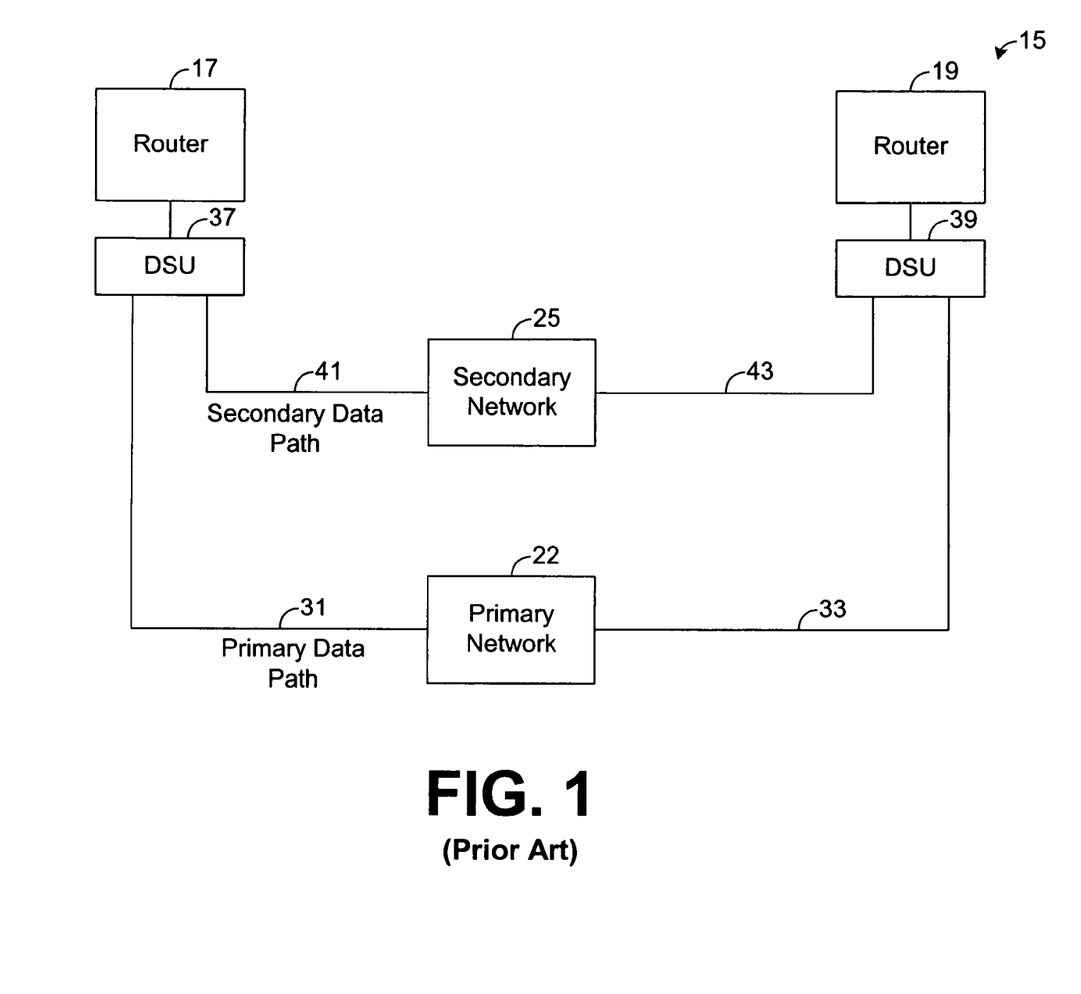
FIG. 1 is a block diagram illustrating a conventional internet protocol (IP) network.

FIG. 1 depicts a typical internet protocol (IP) network 15 of the prior art. For simplicity, the network 15 is shown in FIG. 1 as having two routers 17 and 19 capable of communicating to one another via a primary network 22, such as a frame relay network, for example, and/or a secondary network 25, such as the public switched telephone network (PSTN), for example. However, it should be noted that a conventional IP network 15 typically employs many additional routers (e.g., several thousand) in which each router is capable of communicating to other routers or destinations via an arrangement similar to the one depicted by FIG. 1.

Routers 17 and 19 and their corresponding digital service units (DSUs) 37 and 39 are initially configured to communicate with one another via primary network 22. Thus, the digital service unit (DSU) 37 corresponding to router 17 is coupled to the primary network 22 via a connection 31, such as a T1 connection, for example, and the DSU 39 corresponding to router 19 is coupled to the primary network 22 via a connection 33, such as a T1 connection, for example.

When the router 17 receives data to be communicated to router 19, the router 17 interfaces the data with the DSU 37, and the DSU 37 transmits the data via at least one data packet over connection 31 to primary network 22, which routes the data packet to connection 33 based on header information included in the data packet. Similarly, when the router 19 receives data to be communicated to router 17, the router 19 interfaces the data with the DSU 39, and the DSU 39 transmits the data via at least one data packet over connection 33 to primary network 22, which routes the data packet to connection 31 based on header information included in the data packet. The data path traveled by data packets communicated between routers 17 and 19 via primary network 22 shall be referred to hereafter as the "primary data path" of the network 15.

As shown by FIG. 1, the DSU 37 is also coupled to the secondary network 25 via a connection 41, such as a copper wire pair, for example, and the DSU 39 is coupled to the secondary network 25 via a connection 43, such as a twisted wire pair, for example. If a significant communication problem occurs along the primary data path, then the routers 17 and 19 and their corresponding DSUs 37 and 39 may transition to communicating via secondary network 25. In this regard, once a significant communication problem along the primary data path is detected, the router 17 and/or its corresponding DSU 37 may establish a secondary data path with DSU 39 using connections 41 and 43, as well as secondary network 25, and then utilize this secondary data path to communicate with router 19 in lieu of the primary data path passing through primary network 22. The secondary data path is typically a dedicated path in that the network 25 and the connections 41 and 43 effectively form an end-to-end connection from the DSU 37 to the DSU 39, and each set of data communicated between the routers 17 and 19 is communicated over this end-to-end connection.

Thus, when the router 17 receives data to be communicated to router 19 after the routers 17 and 19 have switched to using the secondary data path, the router 17 interfaces the data with the DSU 37, which transmits the data over connection 41 to secondary network 25 and connection 43. Similarly, when the router 19 receives data to be communicated to router 17, the router 19 interfaces the data with the DSU 39, which transmits the data over connection 43 to secondary network 25 and connection 31. The secondary data path passing through secondary network 25 is essentially used to backup the primary data path passing through the primary network 22.

Figure 2:
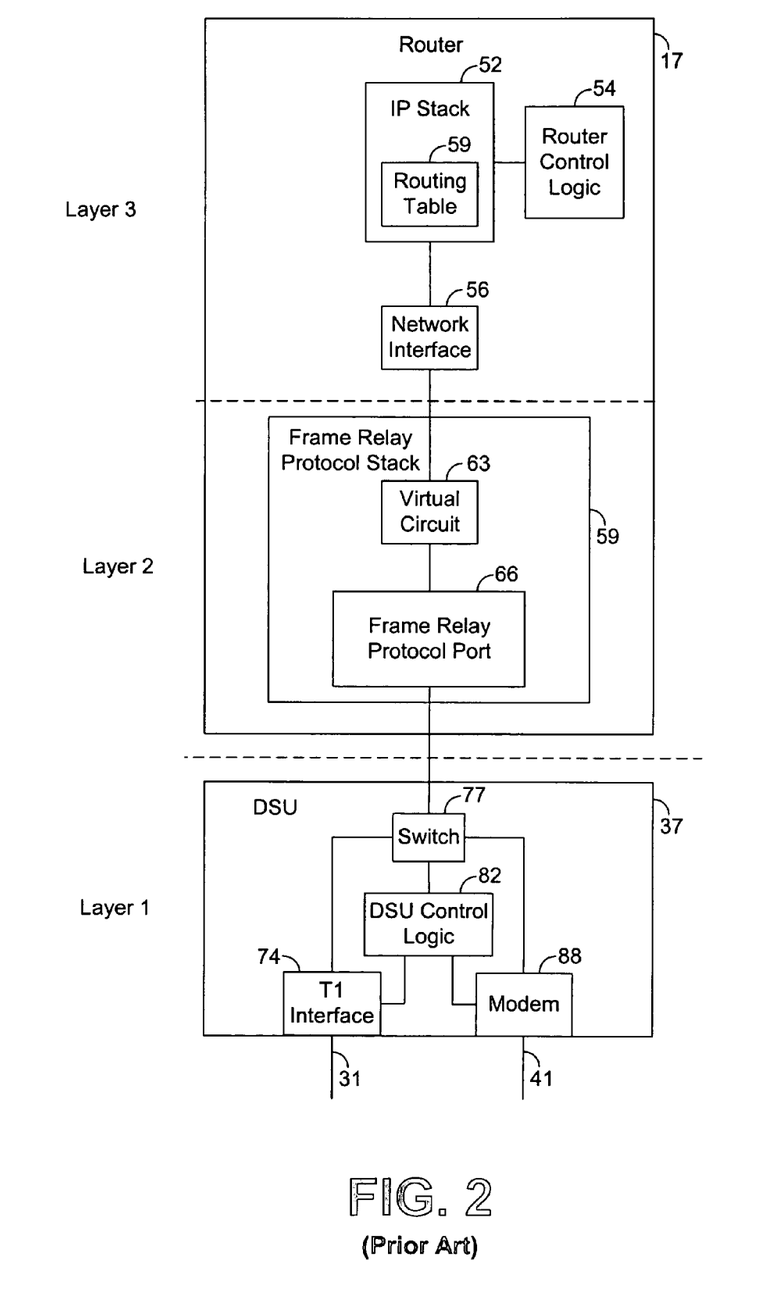
FIG. 2 is a block diagram illustrating one embodiment of a router depicted in FIG. 1.

There are various methodologies employed for backing up the primary data path. FIG. 2 depicts a more detailed view of a configuration of the router 17 and DSU 37 when these components are designed to perform a first type of backup, referred to hereafter as "layer 1 backup." As shown by FIG. 2, the router 17 and its corresponding DSU 37 implement three layers (i.e., layer 1, layer 2, and layer 3) of the well-known International Organization for Standardization Open Systems Interconnection (ISO/OSI) model. In this regard, the ISO/OSI model comprises seven layers. Layer 1 is a physical layer of hardware connections. Layer 2 is a software layer responsible for coding, addressing, and transmitting information, and layer 3 is a software layer responsible for transport routes and message handling. The other layers of the ISO/OSI model are not germane to this disclosure and will not be described in detail herein.

As shown by FIG. 2, the layer 3 portion of the router 17 comprises an IP stack 52, router control logic 54, and a network interface 56. The router control logic 54 generally monitors and controls the operation of the router 17. The IP stack 52 comprises a routing table 59 that specifies a data path for each data packet received by the router 17. In this regard, when a data packet is received by the router 17, the IP stack 52 consults the routing table 59 to determine the data path that the packet is to take to reach its destination. As an example, the routing table 59 may specify that the data packet is to be routed to router 17 via the primary data path. Based on the indicated data path, the IP stack 52 inserts layer 3 route information into the header of the data packet. This information is later used to communicate the data packet across the specified data path.

Based on the specified data path, the IP stack 52 provides the data packet to the network interface 56. As shown by FIG. 2, the network interface 56 is in communication with a frame relay protocol stack 59 comprising a virtual circuit 63 and a frame relay protocol port 66. The virtual circuit 63 adds layer 2 routing information to the header of the data packet. In the embodiment shown by FIGS. 1 and 2, the primary network 22 is a frame relay network. Thus, the virtual circuit 63 appropriately processes the data packet via frame relay protocol such that the data packet is ready for transmission across the primary network 22. In other embodiments where the primary network 22 is not a frame relay network, another type of protocol stack (not shown) compatible with the primary network 22 is used in lieu of frame relay protocol stack 59. In this regard, the layer 2 protocol stack is compatible with the type of protocol employed by the primary network 22. Note that the network interface 56 is, however, typically independent of the protocol of the primary network 22, as well as the secondary network 25. Indeed, the type of primary and secondary networks 22 and 25 employed within the IP network 15 is typically transparent to layer 3 and to the network interface 56, in particular.

After processing the data packet, as described above, the router 17 provides the data packet to the DSU 37, which transmits the data packet across connection 31 to the primary network 22 (FIG. 1). In the embodiment shown by FIG. 2, a T1 interface 74 is coupled to the connection 31 and is initially used to transmit data packets received from the router 17. Thus, a switch 77 is initially set such that data packets received from the router 17 are transmitted to the T1 interface 74.

While the router 17 is communicating according to the techniques described above, a layer 1 error condition may occur. Such an error condition typically occurs between DSU 37 and primary network 22 or between DSU 39 and primary network 22. As an example, the connection 31 may become severed and unable to communicate data. DSU control logic 82 within the DSU 37 is configured to detect the layer 1 error condition. As an example, if the connection 31 is severed, the DSU control logic 82 may detect that the connection 31 is no longer properly terminated thereby detecting a layer 1 error condition.

In response to a detection of a layer 1 error condition, the DSU control logic 82 changes the state of the switch 77 such that data packets received from the router 17 are now transmitted to a modem 88 instead of T1 interface 74. The modem 88 preferably establishes a communication session with the DSU 39 via secondary network 25. The modem 88 then communicates each received data packet over connection 41, secondary network 25, and connection 43 to the DSU 39. Thus, the secondary data path over which the modem 88 communicates, according to the aforedescribed techniques, is used to backup the communication that originally occurs via the primary data path. Note that the DSU 39 may be similarly configured to detect a layer 1 error condition and to then switch from the primary data path to the secondary data path in response to the detection of the layer 1 error condition.

Also note that the layer 1 backup performed by the DSU 37, as described above, is transparent to the router 17 and, therefore, to layers 2 and 3. In this regard, once a layer 1 error condition occurs, the router 17 continues to process each data packet as if the data packet is to be communicated over the packet's primary data path. However, the DSU 37, upon detecting the layer 1 error condition, begins to transmit the data packets over the secondary data path without the knowledge of the components in layers 2 and 3.

Figure 3:
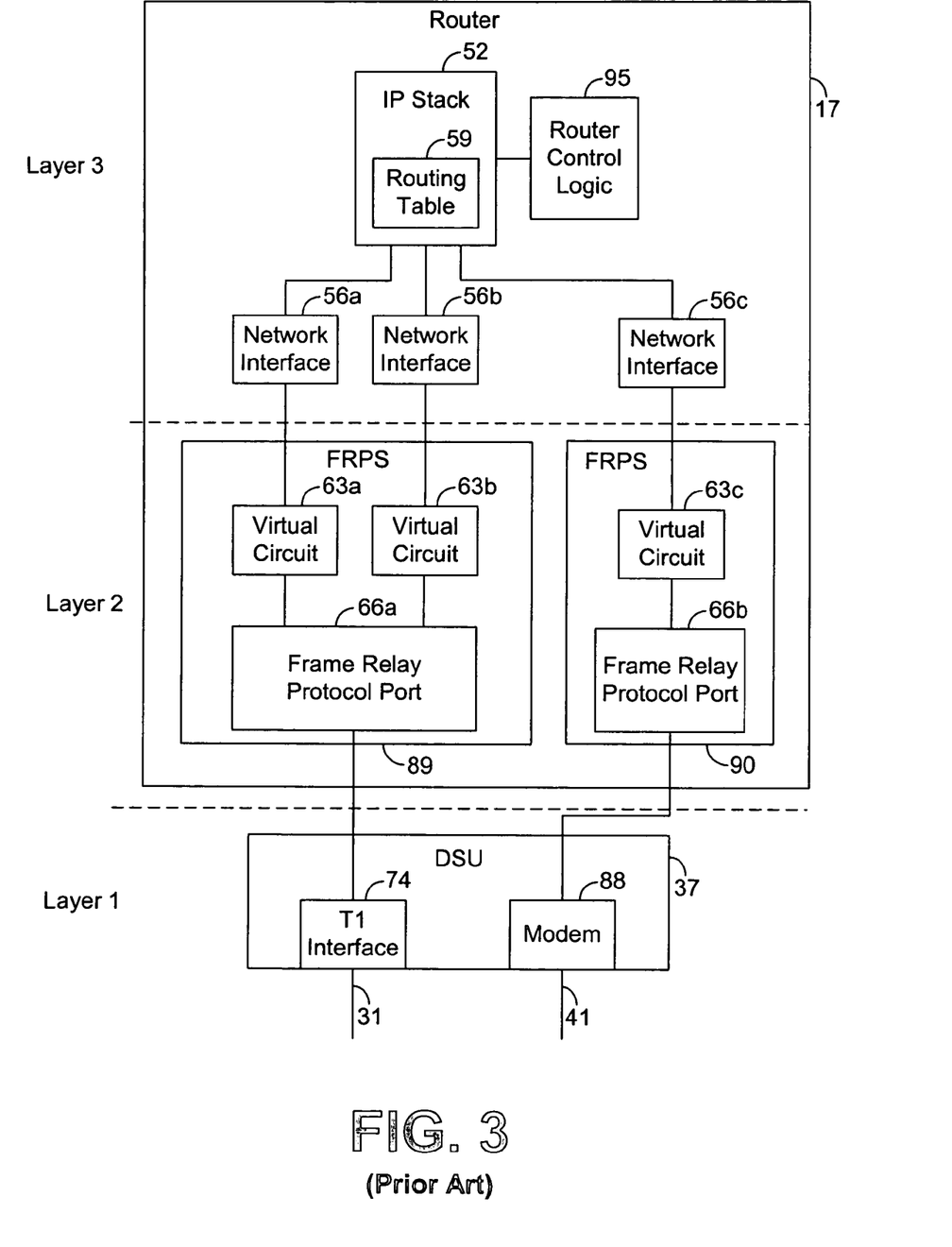
FIG. 3 is a block diagram illustrating another embodiment of a router depicted in FIG. 1.

It should also be noted that the DSU 37 is not typically configured to detect all types of error conditions that may occur along the primary data path. For example, the DSU 37 is not normally configured to detect layer 3 error conditions, which usually occur within the primary network 22. FIG. 3 depicts an embodiment of the router 17 and DSU 37 that are collectively capable of detecting layer 3 error conditions and of backing up the primary data path based on such detections. The type of backup performed by the embodiment depicted by FIG. 3 will be referred to herein as "layer 3 backup."

The components of FIG. 3 essentially perform the same functionality as the components of corresponding reference numbers of FIG. 2. In particular, when the router 17 receives a data packet to be routed to router 19, the IP stack 52, based on the routing table 59, transmits the data packet to one of a plurality of network interfaces 56a-56c based on information in the routing table 59. More specifically, prior to the detection of an error condition, the IP stack 52 transmits the data packet to either network interface 56a or 56b. The network interface 56a or 56b that receives the data packet then provides the data packet to frame relay protocol stack (FRPS) 89, which comprises virtual circuits 63a and 63b, as well as frame relay protocol port 66a.

Each of the network interfaces 56a-56c corresponds to a different virtual circuit 63a-63c. In particular, network interfaces 56a and 56b respectively correspond to virtual circuits 63a and 63b of the frame relay protocol stack 89, and the network interface 56c corresponds to virtual circuit 63c of frame relay protocol stack 90. The virtual circuit 63a or 63b corresponding to the network interface 56a or 56b that processes the aforementioned data packet receives the data packet and, after processing the data packet, provides the data packet to the frame relay protocol port 66a. The frame relay protocol port 66a interfaces the data packet with the T1 interface 74, and the $T_1$ interface 74 then transmits the data packet across connection 31 such that the data packet is communicated via the primary data path to the router 19 (FIG. 1).

In the embodiment depicted by FIG. 3, router control logic 95 is configured to detect a layer 3 error condition. Such a detection may occur in a variety of ways. For example, in normal operation, the IP stack 52 and primary network 22 typically exchange messages according to the protocol employed by the primary network 22. Thus, the network 22 may simply inform the IP stack 52 of a layer 3 error condition detected by the network 22. In another example, the IP stack 52 may be configured to detect a layer 3 error condition if a specified amount of time lapses without receiving a message from the network 22. Note that a layer 2 problem or failure may result in the IP stack 52 not receiving messages from the network 22. In such an example, the layer 2 problem or failure may prevent proper layer 3 operation thereby causing the IP stack 52 to detect an error condition.

When the IP stack 52 detects an error condition, the router control logic 95 adjusts the routing table 59 such that data packets destined for the router 19 (FIG. 1) are no longer transmitted to one of the network interfaces 56a or 55b but are instead transmitted to the network interface 56c. Note that the routing table of the router 19 should be similarly adjusted to reflect the foregoing changes.

As a result of updating the routing table 59, as described above, each data packet destined for the router 19 is processed by the frame relay protocol stack 90 instead of the frame protocol relay stack 89. In particular, each such data packet is processed by the virtual circuit 63c and provided to the modem 88 via the frame relay protocol port 66b. The modem 88 then communicates the data packet to the router 19 via the secondary data path. Thus, by appropriately controlling the routing table 59, as described above, it is possible to use the secondary data path to backup the primary data path. Unfortunately, the detection of error conditions by the IP stack 52 and subsequent updating of the routing table 59 to effectuate the layer 3 backup, as described above, can take a relatively long time thereby increasing the amount of data that may be lost due to an occurrence of a layer 2 or 3 error condition.

Figure 4:
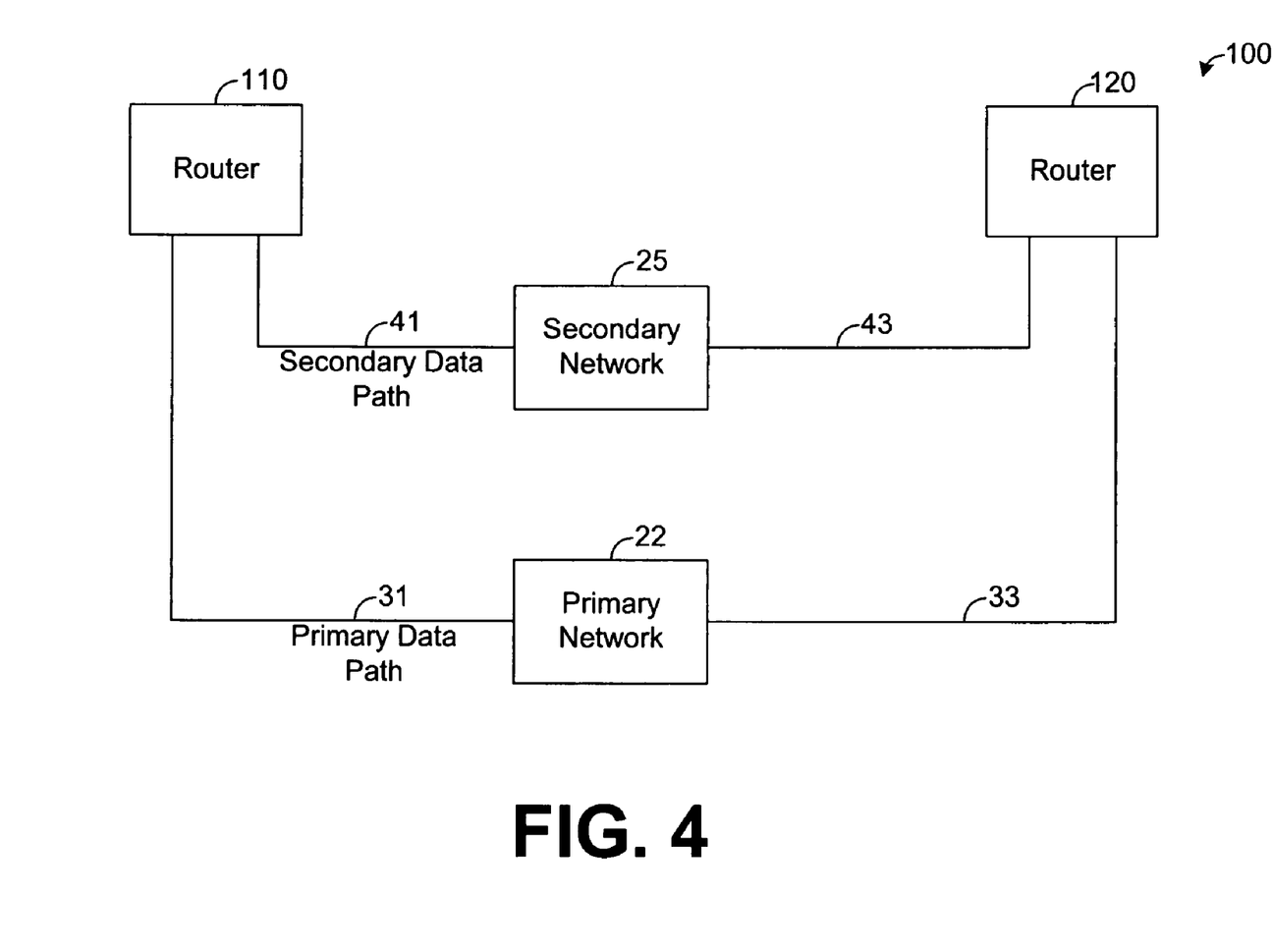
FIG. 4 is a block diagram illustrating an exemplary embodiment of a communication network in accordance with the present invention.

FIG. 4 depicts a communication network 100 in accordance with an exemplary embodiment of the present invention. Although other protocols may be employed, the network 100 is preferably configured to communicate via internet protocol (IP). For simplicity, the network 100 is shown in FIG. 4 as having two routers 110 and 120 capable of communicating to one another via a primary network 22 and/or a secondary network 25. However, it should be noted that the network 110 may employ other routers (not shown) in which each router is capable of communicating via an arrangement similar to the one depicted by FIG. 4.

In a preferred embodiment, the primary network 22 is a frame relay network that is respectively coupled to routers 110 and 120 via connections 31 and 33, and the connections 31 and 33 are T1 connections or some other high speed connections. However, in other embodiments, the primary network 22 may be another type of network without departing from the principles of the present invention.

The secondary network 25 may be any type of known or future-developed network. For illustrative purposes, it will be assumed hereafter that network 25 is capable of communicating data between connections 41 and 43 via point-to-point protocol (PPP). As will be described in more detail hereafter, the primary network 22 and connections 31 and 33 preferably form a primary data path between routers 110 and 120. Further, the secondary network 25 and the connections 41 and 43 preferably form a backup data path between routers 110 and 120.

Figure 5:
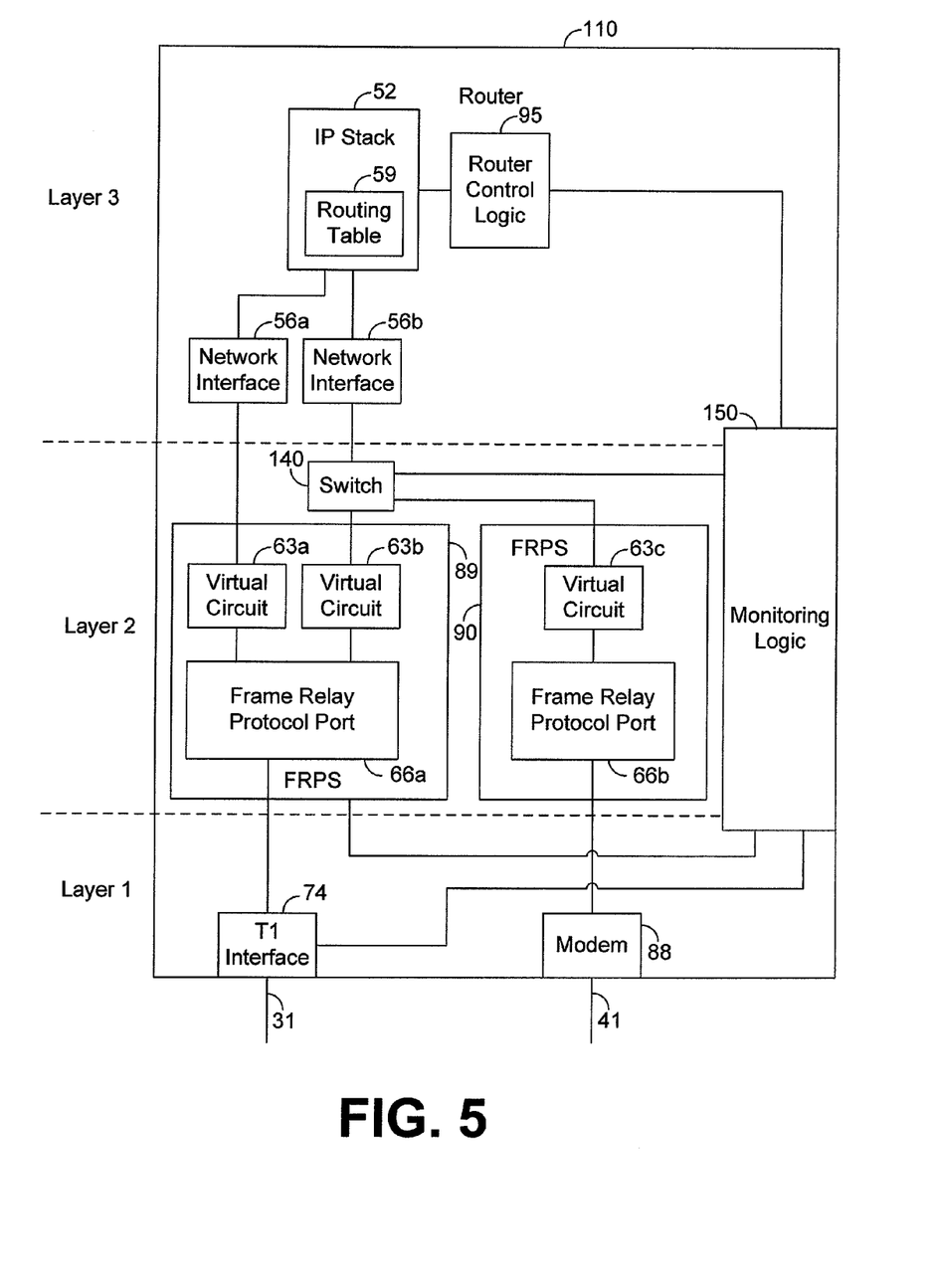
FIG. 5 is a block diagram illustrating an exemplary embodiment of a router depicted in FIG. 4.

FIG. 5 depicts a more detailed view of an exemplary embodiment of the router 110. Note that the router 120 may be similarly configured. As shown by FIG. 5, components for implementing layers 1-3 are integrated into the router 110. In particular, layer 3 comprises, similar to the layer 3 of the router 17 depicted by FIG. 3, an IP stack 52, router control logic 95, and network interfaces 56a and 56b. In addition, layer 2 of the router 110 comprises, similar to the layer 2 of the router 17 depicted by FIG. 3, virtual circuits 63a-63c and frame relay protocol stacks ports 66a and 66b. Layer 2 also comprises a switch 140, which will be described in more detail hereafter.

Unlike the layer 1 components depicted by FIG. 3, the layer 1 components of FIG. 5 are integrated into the router 110 rather than residing external to the router 110, although it is possible for the layer 1 components to be external to the housing that houses components of layers 2 and/or 3. In particular, layer 1 of the router 110 preferably comprises two communication interfaces (e.g., T1 interface 74 and modem 88), although other numbers and types of communication interfaces may be employed in other embodiments, if desired.

Similar to the router 17 of FIG. 3, the router 110 of FIG. 5 is initially configured to communicate data packets destined for router 120 via a primary data path. In this regard, prior to a detection of an error condition, the IP stack 52 interfaces a data packet destined for the router 120 with one of the network interfaces 56a or 56b, depending on the data stored in the routing table 59. The foregoing network interface 56a or 56b then provides the data packet to its corresponding virtual circuit 63a or 63b within the frame relay protocol stack 89. The corresponding virtual circuit 63a or 63b that receives the data packet processes the data packet, as described above, and then provides the data packet to frame relay protocol port 66a. The frame relay protocol port 66a then provides the data packet to the T1 interface 74, which interfaces the data packet with the primary network 22 via connection 31. The network 22 then communicates the data packet to the connection 33, which provides the data packet to the router 120. Note that data may be transmitted from the router 120 to the IP stack 52 of the router 110 in the opposite direction via the same data path.

As shown by FIG. 5, the router 110 preferably comprises monitoring logic 150 that is configured to detect layer 1, layer 2, and layer 3 error conditions. In response to a detection of a layer 1, 2, or 3 error condition, the monitoring logic 150 may switch out least one of the virtual circuits 63a or 63b in favor of a backup virtual circuit 63c for communicating data packets over the secondary data path. In this regard, the monitoring logic 150 preferably communicates with the T1 interface 74, the frame relay protocol stack 89 of the primary data path, and the router control logic 95. The T1 interface 74 may be configured to detect a layer 1 error condition, and the IP stack 52 may be configured to detect a layer 3 error condition. Furthermore, the frame relay protocol stack 89 may be configured to detect a layer 2 error condition. When any such error condition is detected, the detecting component 74, 95, or 89 informs the monitoring logic 150 of the detected error condition. In response, the monitoring logic 150 controls the state of the switch 140 in order to switch communication from the primary data path to the backup data path.

Figure 6:
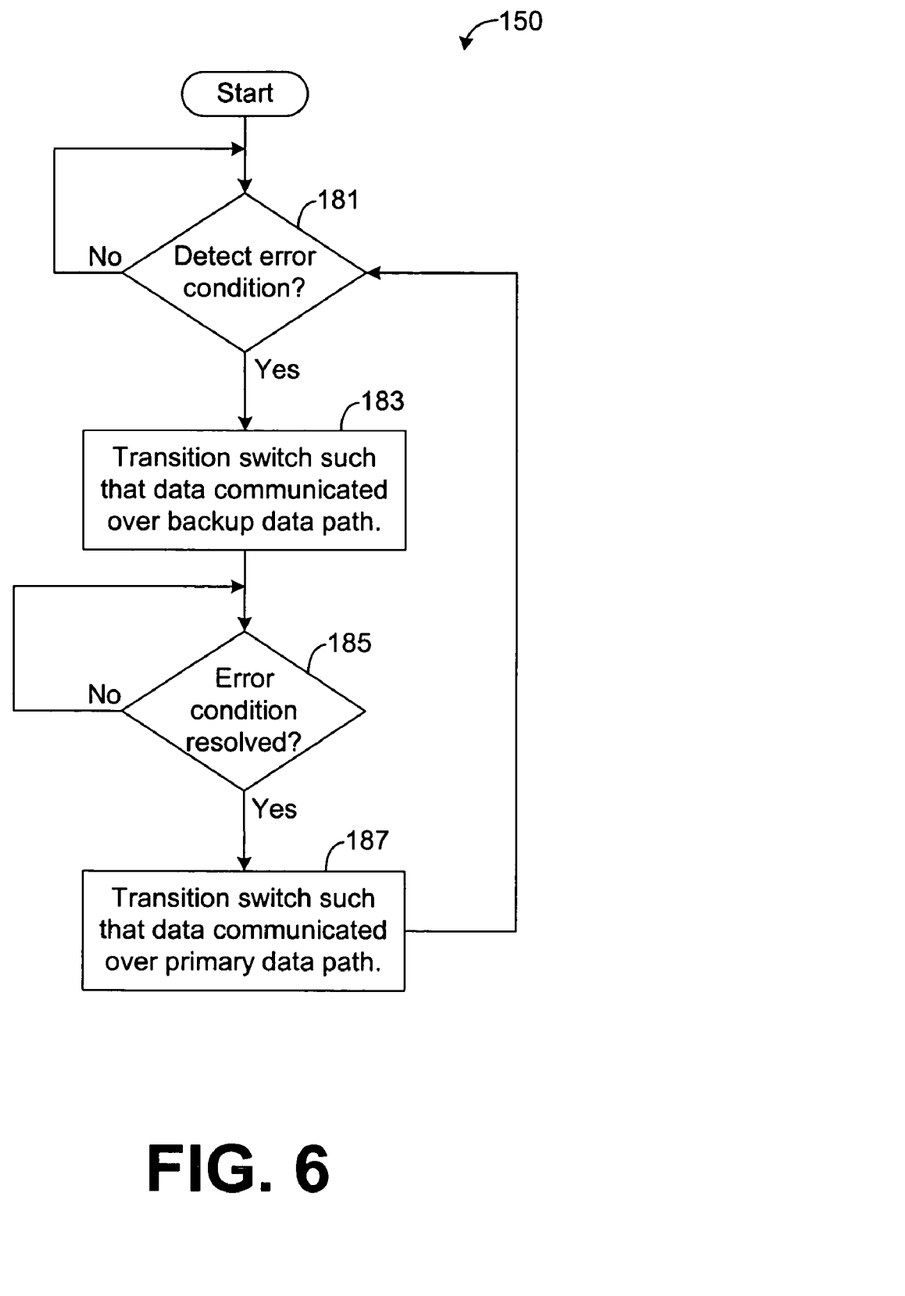
FIG. 6 is a flow chart illustrating an exemplary architecture and functionality of monitoring logic depicted in FIG. 5.

As an example, assume that an error condition is detected, in block 181 of FIG. 6, that prevents data communicated by the virtual circuit 63b from reaching its destination (e.g., router 120). In such an example, the monitoring logic 150, in response to the detected error condition, changes the state of the switch 140 such that data packets from the network interface 56b are provided to virtual circuit 63c instead of virtual circuit 63b, as shown by block 183. The virtual circuit 63c then properly processes the data packet for transmission over the secondary data path. Note that, in a preferred embodiment, data packets communicated over the secondary data path are communicated via PPP, although other types of protocols may be employed in other embodiments. After processing the aforementioned data packet, the frame relay protocol stack 90 provides the data packet to the modem 88, which communicates the data packet across the secondary network 25 and the connections 41 and 43 to the router 120.

After switching the communication of data packets to the backup data path, as described above, the monitoring logic 150 preferably continues to communicate with the T1 interface 74, the frame relay protocol stack 130a, and/or the router control logic 95 to determine when the previously detected error condition is resolved. For example, if the aforedescribed error condition is detected because the frame relay protocol stack 89 stopped receiving messages from the primary network 22, then the monitoring logic 150 may determine that the previously detected error condition is resolved when the frame relay protocol stack 89 begins to receive messages from the network 22. In other examples, other techniques for determining that a previously detected error condition has been resolved may be employed.

When the monitoring logic 150 determines that the previously detected error condition has been resolved, the monitoring logic 150 preferably switches, to the primary data path, the communication occurring across the secondary data path, as shown by blocks 185 and 187 of FIG. 6. In this regard, the monitoring logic 150 adjusts the state of the switch 140 such that data packets from network interface 56b are provided to the virtual circuit 63b instead of the virtual circuit 63c. Thus, such data packets are processed by the virtual circuit 63b and are transmitted over the primary data path via the T1 interface 74.

Note that the switching from the primary data path to the secondary data path and vice versa is preferably transparent to layer 3 and, in particular, the IP stack 52. In this regard, once an error condition occurs, the IP stack 52 continues to process each data packet as if the data packet is to be communicated over the packet's primary data path. However, the monitoring logic 150, upon detecting the error condition, causes the data packets from the network interface 56b to be communicated over the secondary data path rather than the primary data path. It is not necessary for the IP stack 52 to be aware of the data path switch, and it is not necessary for the routing table 59 to be updated to effectuate such a data path switch. Thus, the router 110 is able to complete a data path switch after the occurrence of a layer 2 or 3 error condition much quicker than the router 17 depicted by FIG. 3.

It should be noted that the communication occurring across other virtual circuits (e.g., virtual circuit 63a) in the frame relay protocol stack 89 may be similarly backed up via an additional frame relay protocol stack (not shown) similar to frame relay protocol stack 90. In such a case, an additional switch (not shown), similar to switch 140, may be used to divert, in response to a detected error condition, data packets from the network interface 56a to the virtual circuit (not shown) of the additional frame relay protocol stack. When the detected error condition is resolved, the additional switch may then be used to divert data packets from the network interface 56a back to the virtual circuit 63a of the frame relay protocol stack 89.

Furthermore, it should also be noted that the protocol stacks 89 and 90 are preferably compatible with the primary network 22. Thus, if a different type of primary network 22 is employed, then protocol stacks compatible with this other type of primary network 22 are preferably employed in lieu of the frame relay protocol stacks depicted in FIG. 5. In addition, the network interfaces 56a and 56b, unlike the protocol stacks 89 and 90, are preferably independent of the protocol employed by the primary and secondary networks 22 and 25.

It should be further noted that each of the components of layers 1-3 depicted in FIG. 5 may be implemented in hardware, software, or a combination thereof. However, according to ISO/OSI standards, layer 1 components are generally implemented in hardware, and layer 2 and 3 components are generally implemented in software. To be consistent with such standards, each of the components of layer 2 and 3 are preferably implemented in software as illustrated by way of example in FIG. 7.

Figure 7:
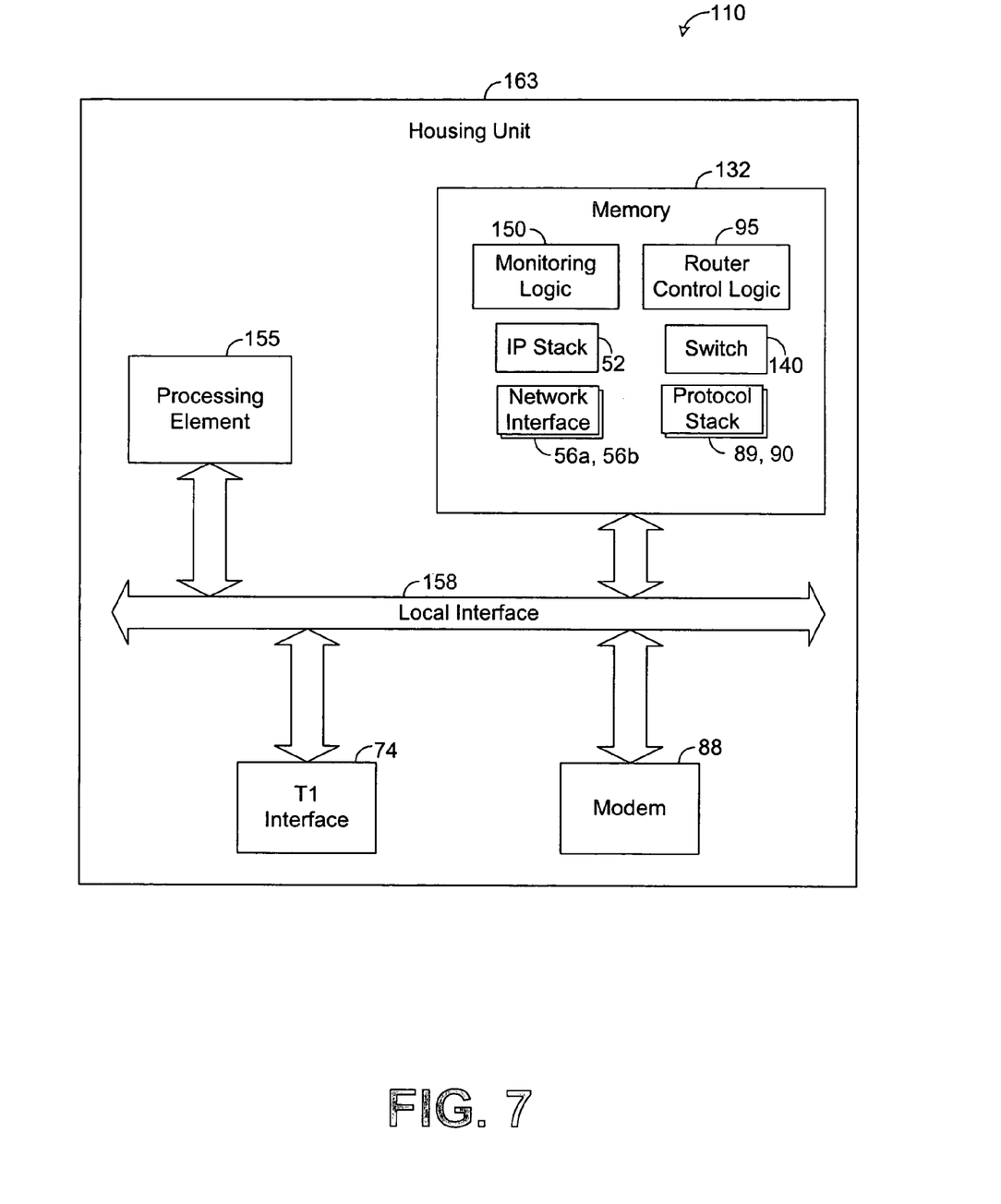
FIG. 7 is a block diagram illustrating an exemplary configuration of the router depicted in FIG. 5.

In this regard, as shown by FIG. 7, the IP stack 52, router control logic 95, network interfaces 56a and 56b, switch 140, and frame relay protocol stacks 89 and 90 are implemented in software and stored within memory 152. The monitoring logic 150, which is outside the ISO/OSI layers, may be implemented in hardware, software, or a combination thereof. In FIG. 7, the monitoring logic 150 is illustratively shown as being implemented in software and stored within the memory 152.

Note that the components of the router 110, when implemented in software, can be stored and transported on any computer-readable medium for use by or in connection with an instruction execution system, apparatus, or device, such as a computer-based system, processor-containing system, or other system that can fetch and execute instructions. In the context of this document, a "computer-readable medium" can be any means that can contain, store, communicate, propagate, or transport a program for use by or in connection with the instruction execution system, apparatus, or device. The computer readable-medium can be, for example but not limited to, an electronic, magnetic, optical, electromagnetic, infrared, or semiconductor system, apparatus, device, or propagation medium. Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The exemplary embodiment of the router 110 depicted by FIG. 7 comprises at least one conventional processing element 155, such as a digital signal processor (DSP) or a central processing unit (CPU), that communicates to and drives the other elements within the router 110 via a local interface 158, which can include at least one bus. Each of the components of the router 110 is preferably housed within a single housing unit 163, although such a feature is not necessary for implementing the present invention.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

Now, therefore, the following is claimed:

1. A network router, comprising:
   memory;
   a layer 1 portion having a first communication interface and a second communication interface;
   a layer 2 portion;
   a layer 3 portion having a layer 3 protocol stack, said layer 3 protocol stack having a routing table stored in said memory and specifying, for a particular destination, a data path from said layer 3 portion to said layer 2 portion, said layer 3 protocol stack configured to provide a first plurality of data packets destined for the particular destination and a second plurality of data packets destined for the particular destination, said layer 3 protocol stack configured to route through said data path each of said first and second plurality of data packets based on said routing table, said layer 3 protocol stack further configured to detect a layer 3 error condition; and
   switching logic configured to automatically initiate a layer 2 switch for said layer 2 portion of said network router in response to a detection of said error condition by said layer 3 protocol stack such that said layer 2 portion interfaces said second plurality of data packets with said second communication interface in lieu of said first communication interface, wherein said layer 2 switch is transparent to said layer 3 portion, wherein said layer 2 portion is configured to interface said first plurality of data packets with said first communication interface prior to said layer 2 switch, wherein said first communication interface is configured to transmit said first plurality of data packets to a second router via a first protocol over a first data path through a first network, and wherein said second communication interface is configured to transmit said second plurality of data packets to said second router via a second protocol over a second data path through a second network.

2. The router of claim 1, wherein said switching logic is further configured to automatically initiate another layer 2 switch, in response to a detection that said error condition is resolved, such that said layer 2 portion interfaces a second plurality of said data packets with said first communication interface in lieu of said second communication interface.

3. The router of claim 1, wherein said second protocol is point-to-point protocol (PPP).

4. The router of claim 1, wherein said first data path comprises a T1 link.

5. The router of claim 4, wherein said second communication interface comprises a modem.

6. The router of claim 1, wherein said layer 3 portion is configured to insert, into each of said first and second plurality of data packets, the same route information based on said routing table.

7. The router of claim 1, wherein said second data path is a dedicated path from said network router to said second router.

8. The router of claim 1, wherein said layer 3 portion has a first network interface, wherein the layer 2 portion has a first protocol stack and a second protocol stack, wherein said switching logic comprises a switch, wherein said switch is coupled to said first network interface, wherein said first protocol stack has a first port coupled to said first communication interface, wherein said second protocol stack has a second port coupled to said second communication interface, wherein said layer 3 protocol stack is configured to transmit each of said first and second plurality of data packets to said first network interface, wherein said switch is configured to receive each of said first and second plurality of data packets from said first network interface, wherein said switch is configured to transmit said first plurality of data packets to said first protocol stack, and wherein said switching logic is configured to update said switch in performing said layer 2 switch such that said second plurality of data packets are transmitted to said second protocol stack in lieu of said first protocol stack after said layer 2 switch.

9. The router of claim 8, wherein said layer 3 portion has a second network interface, wherein said layer 3 protocol stack is configured to transmit a third plurality of data packets to said second network interface, wherein said second network interface is configured to transmit said third plurality of data packets to said first protocol stack, and wherein said first and third plurality of data packets pass through said first port to said first communication interface, and wherein said layer 2 switch is performed without switching a data path of said third plurality of data packets such that at least one of said third plurality of data packets is transmitted through said first port to said first communication interface while said second plurality of data packets are transmitted by the second communication interface to said second router.

10. A network router, comprising:
    memory;
    a layer 3 protocol stack configured to provide a first plurality of data packets to be transmitted by said network router to a second router, the layer 3 protocol stack having a routing table stored in said memory and specifying a data path for routing said first plurality of data packets to said second router, the layer 3 protocol stack configured to insert, into each of said first plurality of data packets, route information indicative of said data path based on said routing table, the layer 3 protocol stack further configured to detect a layer 3 error condition;

a first layer 2 protocol stack;

a second layer 2 protocol stack;

a plurality of layer 3 network interfaces configured to receive data packets from said layer 3 protocol stack, wherein said layer 3 protocol stack is configured to provide each of said first plurality of data packets to one of said layer 3 network interfaces; and layer 2 switching logic configured to receive each of said first plurality of data packets from said one layer 3 network interface, said layer 2 switching logic configured to provide at least one of said first plurality of data packets to said first layer 2 protocol stack such that said at least one of said first plurality of data packets is transmitted via a primary network and a first protocol to said second router, said layer 2 switching logic configured to perform a layer 2 switch in said network router in response to a detection of said error condition by said layer 3 protocol stack such that said layer 2 switching logic provides, in response to said detection, at least one other of said first plurality of data packets to said second layer 2 protocol stack such that said at least one other of said first plurality of data packets is transmitted via a secondary network and a second protocol to said second router, wherein said layer 2 switch is transparent to said layer 3 protocol stack.

11. The router of claim 10, further comprising:

a first communication interface configured to transmit, over said primary network to said second router, each of said first plurality of data packets provided to said first layer 2 protocol stack; and a second communication interface configured to transmit, over said secondary network to said second router, each of said first plurality of data packets provided to said second layer 2 protocol stack.

12. The router of claim 11, wherein said protocol stacks, said network interfaces, said switching logic, and said communication interfaces are each integrated within a housing unit.

13. The router of claim 10, wherein said layer 2 switching logic is configured to provide at least one of said first plurality of data packets to said first layer 2 protocol stack in response to a determination that said error condition has been resolved.

14. The router of claim 10, wherein said layer 3 protocol stack is configured to provide a second plurality of data packets, wherein said first layer 2 protocol stack is configured to receive said second plurality of data packets such that said second plurality of data packets are transmitted via said primary network, and wherein said layer 2 protocol switch is performed without switching a data path for said second plurality of data packets such that at least one of said second plurality of data packets is received by said first layer 2 protocol stack and transmitted via said primary network while said at least one other of said first plurality of data packets is received by said second layer 2 protocol stack and transmitted via said secondary network.

15. The router of claim 14, wherein said layer 2 switching logic comprises a switch configured to receive said first plurality of data packets from said one of said layer 3 network interfaces and to selectively switch said first plurality of data packets between said first and second layer 2 protocol stacks, and wherein said second plurality of data packets bypasses said switch.

16. A method for use in a network router, comprising the steps of:

providing data packets from a layer 3 portion of said network router, said layer 3 portion including a routing table specifying route information for said data packets;

inserting said route information into each of said data packets;

interfacing, via a layer 2 portion of said network router, a first plurality of said data packets with a first communication interface of a layer 1 portion of said network router;

communicating said first plurality of said data packets from said first communication interface over a primary data path to a second router via a first protocol;

detecting, via said layer 3 portion of said network router, a layer 3 error condition associated with said primary data path;

automatically performing a layer 2 switch in said network router in response to said detecting step such that said layer 2 portion of said network router interfaces a second plurality of said data packets with a second communication interface of said layer 1 portion; and communicating said second plurality of data packets from said second communication interface over a backup data path to said second router via a second protocol, wherein said layer 2 switch is transparent to said layer 3 portion.

17. The method of claim 16, further comprising the steps of:

automatically performing a second layer 2 switch in response to a detection that said layer 3 error condition has been resolved such that said layer 2 portion interfaces a third plurality of said data packets with said first communication interface; and communicating said third plurality of data packets from said first communication interface over said primary data path to said second router via said first protocol.

18. The method of claim 16, wherein said second protocol is point-to-point protocol (PPP).

19. The method of claim 16, wherein said second communication interface comprises a modem.

20. The method of claim 19, wherein said primary data path comprises a T1 link.

21. A method for use in a network router, comprising the steps of:

using a layer 3 protocol stack within said network router to provide a first plurality of data packets, said layer 3 protocol stack including a routing table specifying route information for said first plurality of data packets;

inserting said route information into each of said first plurality of data packets;

transmitting said first plurality of data packets from a first layer 1 communication interface over a primary data path to a second router via a first protocol and from a second layer 1 communication interface over a backup data path to said second router via a second protocol;

transmitting each of said first plurality of data packets to one of a plurality of layer 3 network interfaces within said network router;

detecting, via said layer 3 protocol stack, a layer 3 error condition associated with said primary data path;

transmitting at least one of said first plurality of data packets from said one layer 3 network interface to a first layer 2 protocol stack of a plurality of layer 2 protocol stacks within said network router; and changing which of said plurality of layer 2 protocol stacks receives said first plurality of data packets based on said detecting step without updating said layer 3 protocol stack based on said detecting step such that at least one of said first plurality of data packets is received by a second layer 2 protocol stack of said plurality of layer 2 protocol stacks within said network router, wherein each of said first plurality of data packets received by said first layer 2 protocol stack is transmitted over said primary data path and each of said first plurality of data packets received by said second layer 2 protocol stack is transmitted over said backup data path.

22. The method of claim 21, further comprising the steps of:

using said layer 3 protocol stack to provide a second plurality of data packets;

transmitting each of said second plurality of data packets to said first layer 2 protocol stack, said first layer 2 protocol stack having a port coupled to a first communication interface;

passing through said port each of said first and second plurality of data packets received by said first layer 2 protocol stack, wherein said changing step is performed without changing which of said layer 2 protocol stacks receives said second plurality of data packets such that at least one of said second plurality of data packets is received by said first layer 2 protocol stack and passes through said port while at least one of said first plurality of data packet is transmitted via said second layer 2 protocol stack over said backup data path.

23. A network router, comprising:

memory;

a layer 1 portion having a first communication interface and a second communication interface, wherein said first communication interface is configured to transmit to a second router via a first protocol over a primary data path through a first network, and wherein said second communication interface is configured to transmit to said second router via a second protocol over a backup data path through a second network;

a layer 2 portion;

a layer 3 portion having a layer 3 protocol stack, said layer 3 protocol stack having a routing table stored in said memory and configured to provide a first plurality of data packets destined for a particular destination, said first plurality of data packets including at least a first data packet and a second data packet, said layer 3 protocol stack configured to insert layer 3 route information into a respective header of each of said first plurality of data packets based on said routing table, said layer 3 route information indicative of said primary data path, said layer 3 protocol stack configured to detect a layer 3 error condition associated with said primary data path, wherein said first data packet is transmitted by said first communication interface via said first protocol over said primary data path to said second router; and switching logic configured to automatically initiate a layer 2 switch in said network router in response to a detection of said error condition by said layer 3 stack such that said layer 2 portion interfaces said second data packet with said second communication interface, wherein said second data packet is transmitted by said second communication interface via said second protocol over said backup data path to said second router, and wherein said layer 2 switch is transparent to said layer 3 portion.

24. The router of claim 23, wherein said primary data path passes through a network, wherein said layer 3 protocol stack is configured to provide a second plurality of data packets, wherein said layer 2 portion is configured to interface said second plurality of data packets with said first communication interface such that said second plurality of data packets is transmitted through said network, and wherein said layer 2 switch is performed without said layer 2 portion switching a data path for said second plurality of data packets such that at least one of said second plurality of data packets is interfaced with said first communication interface and transmitted through said network while said second data packet is interfaced with said second communication interface and transmitted over said backup data path.

25. The router of claim 24, wherein said switching logic comprises a switch configured to receive said first plurality of data packets and to selectively switch said first plurality of data packets between first and second layer 2 protocol stacks of said layer 2 portion, wherein said first layer 2 protocol stack is configured to receive said second plurality of data packets, and wherein said second plurality of data packets bypasses said switch.

* * * * *